United States Patent
Solinas et al.

(10) Patent No.: US 7,793,522 B2
(45) Date of Patent: Sep. 14, 2010

(54) METHOD AND APPARATUS FOR FORMING A PREFORM FOR A MICRO-STRUCTURED OPTICAL FIBER

(75) Inventors: Stefano Solinas, Milan (IT); Franco Veronelli, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 884 days.

(21) Appl. No.: 10/558,278

(22) PCT Filed: May 30, 2003

(86) PCT No.: PCT/EP03/05784

§ 371 (c)(1),
(2), (4) Date: Dec. 1, 2006

(87) PCT Pub. No.: WO2004/106249

PCT Pub. Date: Dec. 9, 2004

(65) Prior Publication Data

US 2007/0095107 A1    May 3, 2007

(51) Int. Cl.
*C03B 37/016* (2006.01)
*C03B 37/075* (2006.01)

(52) U.S. Cl. ............................. 65/395; 65/404; 65/440; 65/439

(58) Field of Classification Search ............ 65/395, 65/404, 440, 396, 439
See application file for complete search history.

(56) References Cited

U.S. PATENT DOCUMENTS

| | | | |
|---|---|---|---|
| 5,185,020 A * | 2/1993 | Satoh et al. | 65/404 |
| 5,207,814 A | 5/1993 | Cogliati et al. | |
| 5,802,236 A | 9/1998 | DiGiovanni et al. | |
| 5,922,099 A * | 7/1999 | Yoon et al. | 65/395 |
| 6,299,822 B1 * | 10/2001 | Yoon et al. | 264/621 |

(Continued)

FOREIGN PATENT DOCUMENTS

EP    0 652 184 A1    5/1995

(Continued)

OTHER PUBLICATIONS

C.J. Brinker, G.W. Scherer, "Sol-Gel Science: The Physics and Chemistry of Sol-Gel Processing". Academic Press, New York-London, 1990. (ISBN 0 12 134970 5).*

(Continued)

*Primary Examiner*—Jason L. Lazorcik
(74) *Attorney, Agent, or Firm*—Finnegan, Henderson, Farabow, Garrett & Dunner, L.L.P.

(57) ABSTRACT

An intermediate preform is formed in a process of manufacturing an optical fibre by forming a sol containing a glass precursor; pouring the sol in a mold containing a set of elongate elements; aging the sol to obtain a gel body; removing the set of elongate elements from the gel body to create a corresponding set of holes in the gel body; and removing the gel body from the mold. The method further provides imparting a motion of the set of elongate elements during aging of the sol to avoid adhesion of the gel to the elongate elements, the motion being preferably a rotation about the respective axes or an alternate translation along the respective axes. An apparatus with means for carrying out the method is also described.

18 Claims, 5 Drawing Sheets

U.S. PATENT DOCUMENTS

| | | | |
|---|---|---|---|
| 6,467,312 B1 * | 10/2002 | De Hazan et al. | 65/395 |
| 2001/0029756 A1 | 10/2001 | Pack et al. | |
| 2004/0050110 A1 * | 3/2004 | Berkey et al. | 65/393 |
| 2004/0172979 A1 * | 9/2004 | Bhandarkar et al. | 65/395 |
| 2005/0072192 A1 * | 4/2005 | Arimondi et al. | 65/393 |
| 2005/0172674 A1 * | 8/2005 | Oh et al. | 65/393 |
| 2005/0178160 A1 * | 8/2005 | Baik et al. | 65/393 |

FOREIGN PATENT DOCUMENTS

| | | |
|---|---|---|
| EP | 1 172 339 A1 | 1/2002 |
| EP | 1 199 581 A1 | 4/2002 |
| WO | WO-99/00685 | 1/1999 |
| WO | WO-00/60388 | 10/2000 |

OTHER PUBLICATIONS

Kinght et al.; "Photonic Band Gap Guidance in Optical Fibers"; Science, vol. 282, pp. 1476-1478, (1998).

* cited by examiner

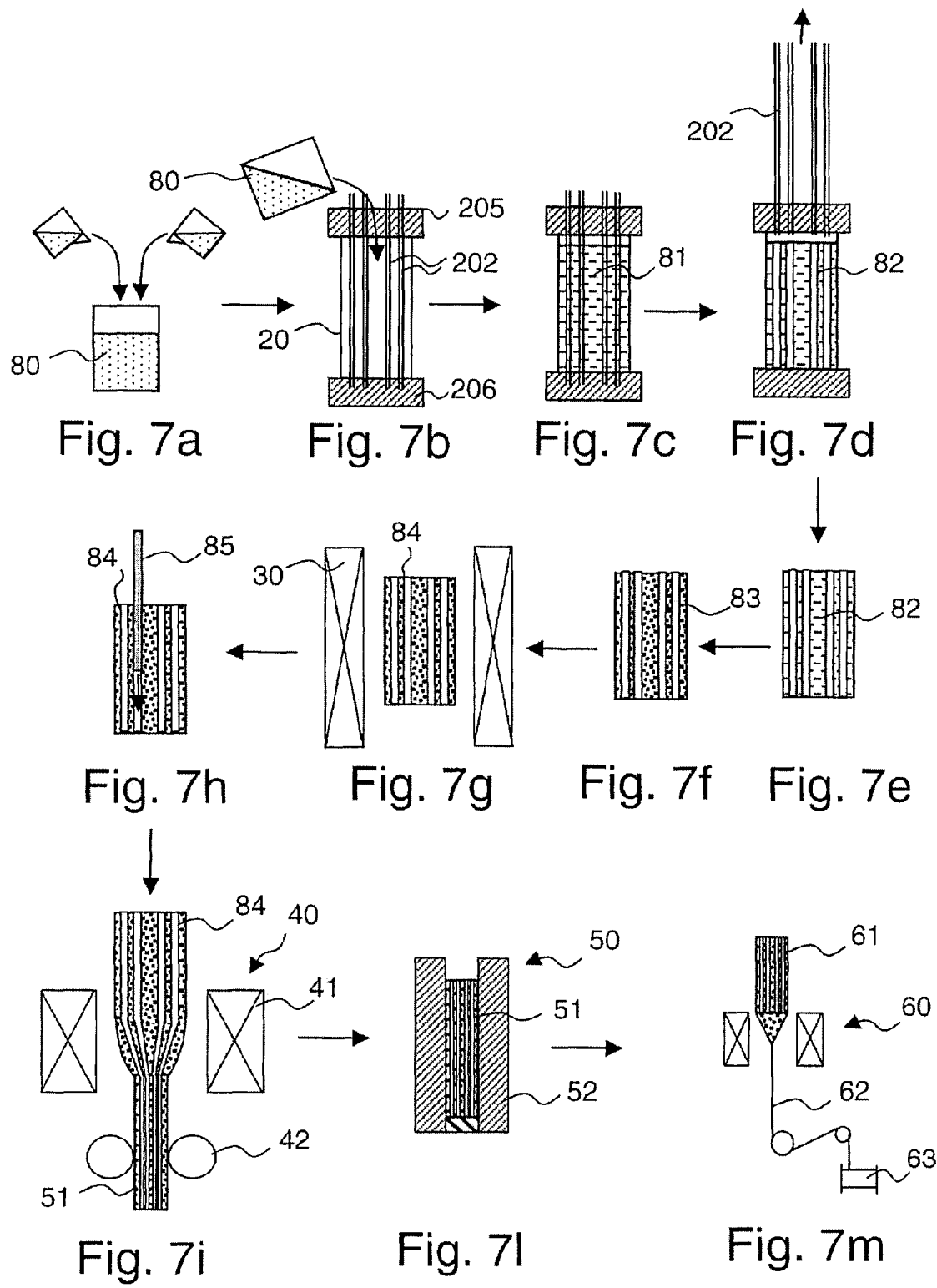

METHOD AND APPARATUS FOR FORMING A PREFORM FOR A MICRO-STRUCTURED OPTICAL FIBER

CROSS REFERENCE TO RELATED APPLICATION

This application is a national phase application based on PCT/EP2003/005784, filed May 30, 2003, the content of which is incorporated herein by reference:

BACKGROUND OF THE INVENTION

1. Field of the Invention

This invention relates to a process and an apparatus for manufacturing a micro-structured optical fibre.

2. Description of the Related Art

Optical fibres are used for transmitting light from one place to another. Normally, optical fibres are made of more than one material. A first material is used to form a central light-carrying part of the fibre known as the core, while a second material surrounds the first material and forms a part of the fibre known as the cladding. Light can become trapped within the core by total internal reflection at the core/cladding interface.

These conventional fibres are typically produced by well-known vapour deposition techniques, such as MCVD (Modified Chemical Vapor Deposition), OVD (Outside Vapor Deposition) and VAD (Vapor-phase Axial Deposition).

A more recent type of optical fibre waveguide, having a significantly different structure from that of conventional optical fibres, is the micro-structured fibre (also known as "photonic crystal fibre" or "holey fiber"). A micro-structured optical fibre is a fibre made of a same homogeneous material (typically silica), having inside a micro-structure (i.e. a structure on the scale of the optical wavelength) defined by microstructural elements extending longitudinally along the fibre and having a predetermined distribution. As a micro-structural element it is possible to identify a micro-hole or a filiform element of a different material than the bulk.

The most common type of micro-structured optical fibre has a cladding region showing a plurality of equally-spaced tiny holes, surrounding a homogeneous and uniform central (core) region. A fibre of this type is described, for example, in international patent application WO 99/00685. In a different embodiment, the central region of the fibre may have a central hole, as described, for example, in international patent application WO 00/60388

These two types of fibres convey light in the core according to different optical phenomena.

In the absence of a central hole, propagation of light in the cladding region is forbidden due to the presence of a lowering of the average refractive index with respect to the core region. Such a structure forms a low-loss all-silica optical waveguide that, by appropriately selecting the values of its characteristic parameters, remains monomode for all wavelengths within the transmission window of the silica. The waveguiding mechanism in that case is closely related to that in conventional optical fibres and is a form of total internal reflection between two materials (air and silica) having different refractive indexes.

In the presence of a central hole, propagation in the cladding region is forbidden due the presence of a "photonic band-gap". The "photonic band-gap" phenomenon, which is analogous to the "electronic band-gap" known in solid-state physics, avoids light of certain frequencies to propagate in the zone occupied by the array of holes, this light being therefore confined in the core region. Propagation of light in fibres showing a photonic band gap is described, for example, in J. C. Knight, J. Broeng, T. A. Birks and P. St. J. Russell, "Photonic Band Gap Guidance in Optical Fibres", Science 282 1476 (1998)).

Optical characteristics of the above-described micro-structured fibres depend on the number of holes, the holes diameter, the reciprocal distance between adjacent holes and the hole geometrical pattern. Since each of these parameters can broadly vary, fibres of very different characteristics can be designed.

Micro-structured optical fibres are typically manufactured by the so-called "stack-and-draw" method, wherein an array of silica rods and/or tubes are stacked in a close-packed arrangement to form a preform, that can be drawn into a fibre using a conventional tower setup.

In U.S. Pat. No. 5,802,236A, for example, a core element (e.g., a silica rod) and a multiplicity of capillary tubes (e.g., silica tubes) are provided, and the capillary tubes are arranged as a bundle, with the core element typically in the center of the bundle. The bundle is held together by one or more overclad tubes that are collapsed onto the bundle so as to preserve the close-packed arrangement. The fibre is then drawn from the resulting preform, by feeding the preform into the hot region of a conventional draw furnace.

The Applicant has noted that the stack-and-draw manufacturing method has several drawbacks.

The awkwardness of assembling hundreds of very thin tubes, as well as the possible presence of interstitial cavities when stacking and drawing such tubes, may affect dramatically the fibre attenuation by introducing impurities, undesired interfaces and inducing a reshaping or deformation of the starting holes due to the transport of mass from the tube toward the interstitial holes. Other problems of the stack-and-draw method may be represented by the low purity of the tube materials and by the difficulties in producing tubes of the required dimensions and in obtaining the required pattern of holes. Moreover, the relatively low productivity and high cost make this method not particularly suitable for industrial production.

A different technique, that at least partially overcomes the above problems, makes use of the sol-gel process for producing the glass preform. This technique is described for example in EP1172339A1 in the name of Lucent Technologies Inc., relating to a method of making microstructured optical fiber. This method comprises providing a mold with a multiplicity of elongate elements extending into the mold and being maintained in a predetermined spatial arrangement with respect to the mold, introducing a silica-containing sol into the mold and causing or permitting it to gel. After a gel body has been formed, the elongate elements are removed from the gel body and the gel body is removed from the mold. Alternatively, the elongate elements may be extracted after separation of the gel body from the mould. The gel body is then dried, sintered and purified, and the microstructured fiber is drawn from the sintered body. Removal of the elongate members may be accomplished mechanically, by pulling them up from the mould individually or in small groups. Alternatively, the elongate elements may consist of a polymer and they can be removed by chemical or thermal action, e.g. by exposure of the assembly to an appropriate solvent or by pyrolysis, respectively.

The techniques for removing the elongate elements described EP1172339A1 show some drawbacks.

The Applicant has verified that removal by thermal action is impractical, since the heat generated by combustion of the elongate members can cause the crack of the gel body.

As concerns chemical removal, EP1172339A1 do not specify what material of the rods and what solvent can actually be used for this purpose. The Applicant is of the opinion that such a process would in any case affect the integrity of the gel body.

With reference to the mechanical extraction proposed in as described in EP1172339A1, the Applicant has found that there is again the risk of cracking of the gel preform. In particular, the Applicant has experimentally found two causes of gel cracking during the extraction of the elements.

The first cause is adhesion of the gel to the surface of the elements. The Applicant has observed that such adhesion may be broken by imparting a slight torsion to the elements before their extraction from the gel. However, the torsion of the elements causes interfacial stresses and micro-cracks in the fragile gel surface.

The second cause is related to the fact that the diameter of the longitudinal elements may not be constant as a function of axial position. This is especially true for small diameter elements, such as elements with diameter lower than 2 mm. Therefore, a longitudinal portion of an element may have a diameter slightly greater than the hole of the gel in an adjacent longitudinal position along the direction of extraction. During extraction, this longitudinal portion of the element will then be forced into surface contact with the smaller diameter gel hole, resulting in stress and cracking of the gel surface.

SUMMARY OF THE INVENTION

The Applicant has now found that, by imparting a motion to the longitudinal elements during gelation of the sol, the above-mentioned problems of stress and cracking of the gel surface ate prevented. The motion may be a rotation of the longitudinal elements about their axis and/or a translation of the elongate elements along their axis.

The Applicant has observed that, when such a motion is imparted to the elongate elements during gelation of the sol, adhesion of the gel to the surface of the rotating element is prevented. If the longitudinal elements are set into rotation, a shearing motion of the liquid near that surface is also produced, which results in the generation in the gel of a hole that is slightly larger in diameter than the element, thereby reducing the probability of gel surface cracking during the extraction. However, the solution of imparting an axial (alternate) translation to the longitudinal elements may be easier implemented when the number of longitudinal elements is high.

The present invention thus relates to a method for forming an intermediate preform in a process of manufacturing a micro-structured optical fiber, comprising the steps of:
  forming a sol containing a glass precursor;
  pouring the sol in a container having inside a set of elongate elements;
  aging the sol so as to obtain a gel body;
  removing at least one of the elongate elements from the gel body to create a corresponding hole in the gel body; and
  removing the gel body from the container;
  wherein the method further comprises imparting a motion to said at least one elongate element during at least part of the step of transforming the sol into a gel.

The removal of the at least one elongate elements from the gel body is preferably performed before removal of the gel body from the container, but may as well be performed after that step.

Imparting a motion to the at least one elongate element may comprise imparting a rotation to the at least one elongate element about its longitudinal axis. The rotation is preferably imparted at a rate comprised between about 1 and 120 rpm.

Alternatively, imparting a motion to the at least one elongate element may comprise imparting an axial movement to the at least one elongate element. The axial movement is preferably an alternate movement and is imparted with a velocity preferably comprised between about 1 and 20 mm/min.

As a further alternative, imparting a motion to the at least one elongate element may comprise imparting to the at least one elongate element a rotation about its longitudinal axis and an axial movement.

In a possible realization of the method, all the elongate elements of said set are removed from the gel body. In this case, the method preferably comprises imparting a motion to all the elongate elements of said set during at least part of the step of transforming the sol into a gel.

Alternatively, at least one of said elongate elements may be kept in the gel body.

The step of forming a sol preferably comprises mixing at least one glass precursor and water.

The elongate elements are preferably rod-like or tubular members.

The present invention also relates to an intermediate preform as obtainable by the method previously described.

In a further aspect thereof, the present invention relates to a process for manufacturing a micro-structured optical fiber, comprising:
  forming an intermediate preform according to the method previously described;
  drying the intermediate preform;
  sintering the dried intermediate preform to obtain a glass preform; and
  structurally modifying the glass preform to obtain the micro-structured optical fibre.

The intermediate preform formed according to the method previously described has at least a longitudinal hole, and the process may further comprise, after drying the intermediate preform and before sintering the dried intermediate preform, or after sintering the dried intermediate preform and before structurally modifying the cylindrical glass preform, the step of inserting at least a micro-structural generating element into said at least a hole.

The step of structurally modifying the glass preform may comprise stretching the glass preform to obtain a core rod.

The step of structurally modifying the glass preform may further comprise applying glass material externally to the core rod to obtain a final preform.

Moreover, the step of structurally modifying the glass preform may comprise drawing the final preform to obtain the micro-structured optical fibre.

The present invention also relates to a micro-structured optical fibre as obtainable by the process previously described.

According to a still further aspect thereof, the present invention relates to an apparatus for forming an intermediate preform in a process of manufacturing an optical fibre, the apparatus comprising a mold apt to contain a sol to be transformed into a gel body; the mold including a cylindrical container and a set of parallel elongate elements arranged inside the container for forming a corresponding set of holes in the gel body, and further comprising a mechanism for imparting a continuous motion to the elongate members during transformation of the sol into gel.

Said mechanism may be of a type suitable to impart a rotation to the elongate elements about the respective axes, for example a mechanism comprising gear wheels.

Alternatively, said mechanism may be of a type suitable to impart a translation, preferably with alternate motion, to the elongate elements along the respective axes. For example, said mechanism may comprise a slide axially integral to the elongate elements and coupled to a vertical guide, and a device for moving the slide along the guide. In this case, the elongate elements are preferably coupled to the slide by means of coupling members providing a negligible constraint to the rotation of said elongate elements.

As a further alternative, said mechanism may be of a type suitable to impart to the elongate elements both translation (preferably alternate) along the respective axes and a rotation about the respective axes.

BRIEF DESCRIPTION OF THE DRAWINGS

Further details may be found in the following description, which refers to the appended figures listed here:

FIGS. 7a to 7m show schematically the different steps of a process for manufacturing a micro-structured optical fiber according to the present invention.

DETAILED DESCRIPTION OF THE INVENTION

Figure 1:
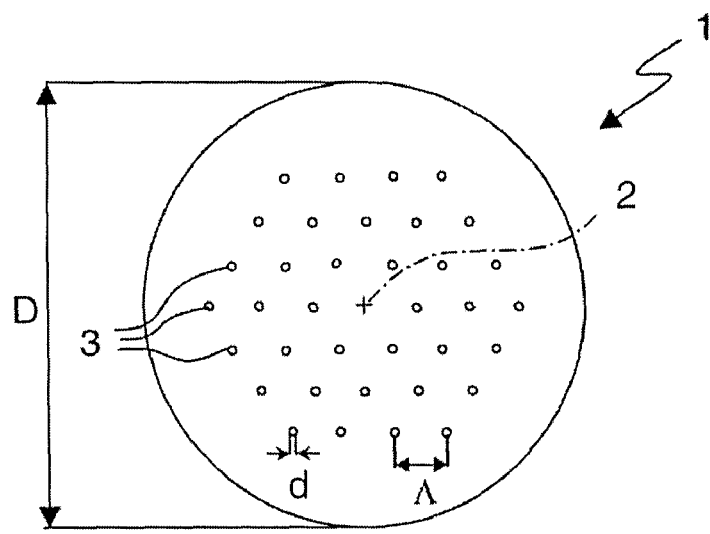
FIG. 1 shows a micro-structured optical fiber.

FIG. 1 illustrates, in cross-section, a micro-structured optical fibre 1 suitable to transmit telecommunication optical signals.

Fibre 1 has a central axis 2 and a set of longitudinal holes 3 parallel to axis 2 and arranged symmetrically about axis 2. The array of holes 3 shows a "defect" in its central region, since a hole is missing along axis 2. As is well known, the presence of such a "defect" is necessary to have the desired light-guiding properties of the fiber.

Holes 3 preferably have the same dimensions, but may also have different dimensions, for example as described in U.S. Pat. No. 5,802,236 (wherein the holes of an inner crown have greater dimensions than the more external ones).

Holes 3 may contain air or a different gas, or may be filled with a liquid or with material that is different from that of the hosting glass body. If the holes 3 are filled with a different material, this material will typically have a different refractive index than the surrounding material.

In an alternative embodiment (not shown), the fiber may have a central hole coaxial to axis 2 of greater dimension than holes 3. Again, this central hole may contain air or a different gas, or may be filled with a liquid or with material that is different from that of the hosting glass body.

The parameters characterizing the above-described micro-structured fibre are the diameter d of holes 3, the spacing (pitch) $\Lambda$ between two adjacent holes 3, the external diameter D of the fiber and, if a central hole is present, the diameter of the central hole.

The fiber properties depend, at a predetermined light wavelength $\lambda$ on the ratios $d/\Lambda$ and $\Lambda/\lambda$. Typically, the quantities d and $\Lambda$ are in the micron scale and D is, for a standard fibre, 125 μm. The ratio $d/\Lambda$ is preferably comprised between 0.1 and 0.5 and the ratio $\Lambda/\lambda$ is preferably comprised between 0.5 and 10, while the ratio $d/D$ is preferably comprised between 0.004 and 0.08 (a typical value being $1/125$). If the diameter d of holes 3 is a sufficiently small fraction of the pitch $\Lambda$, the fiber guides light in a single mode.

Figure 2:
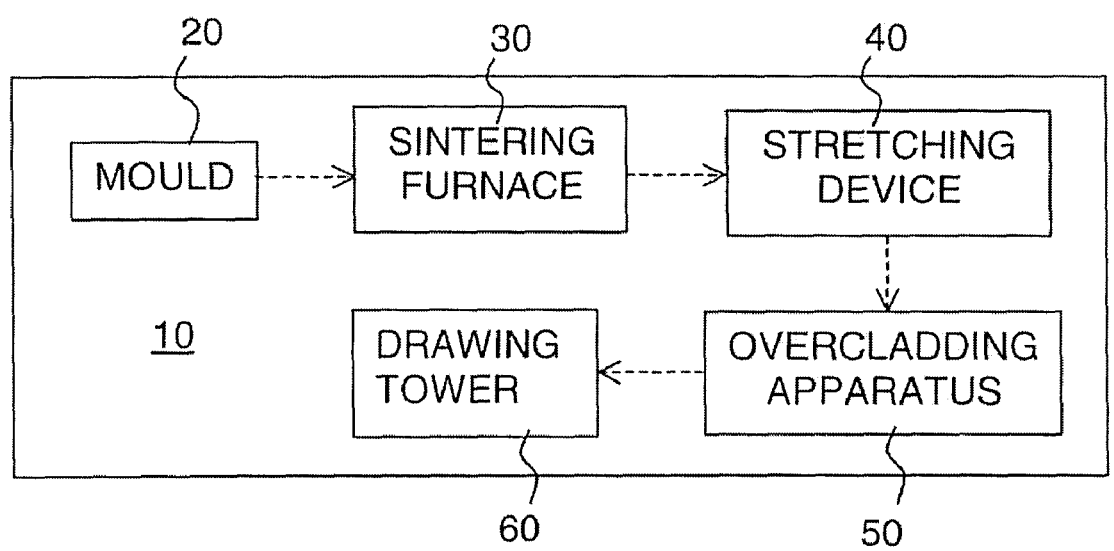
FIG. 2 is a block representation of an assembly for manufacturing a micro-structured optical fiber according to the present invention.

An assembly suitable for the manufacture of a micro-structured fibre of the type previously described is schematically depicted in FIG. 2 and is here indicated as a whole with 10. Assembly 10 comprises a molding apparatus 20 for producing a gel core preform from a sol, a furnace 30 for sintering the gel core preform after drying thereof, thus obtaining an intermediate glass core preform, a stretching device 40 for stretching the intermediate glass core preform into a core rod, an overcladding assembly 50 to apply an external cladding to the core rod thus obtaining a final preform, and a drawing tower 60 for drawing an optical fibre from the final preform. A dashed line shows the sequential order of operation of the different parts of assembly 10.

Figure 3:
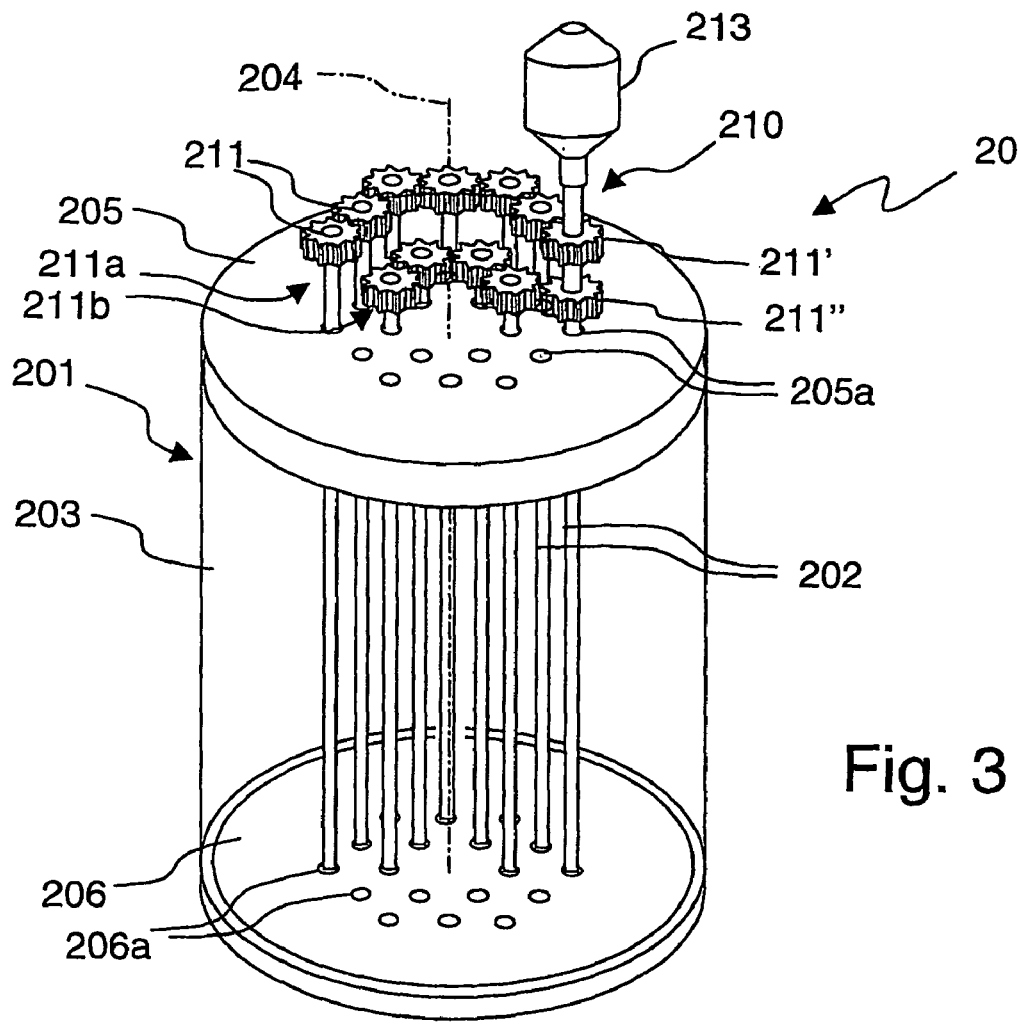
FIG. 3 shows a molding apparatus according to the present invention.
Figure 4:
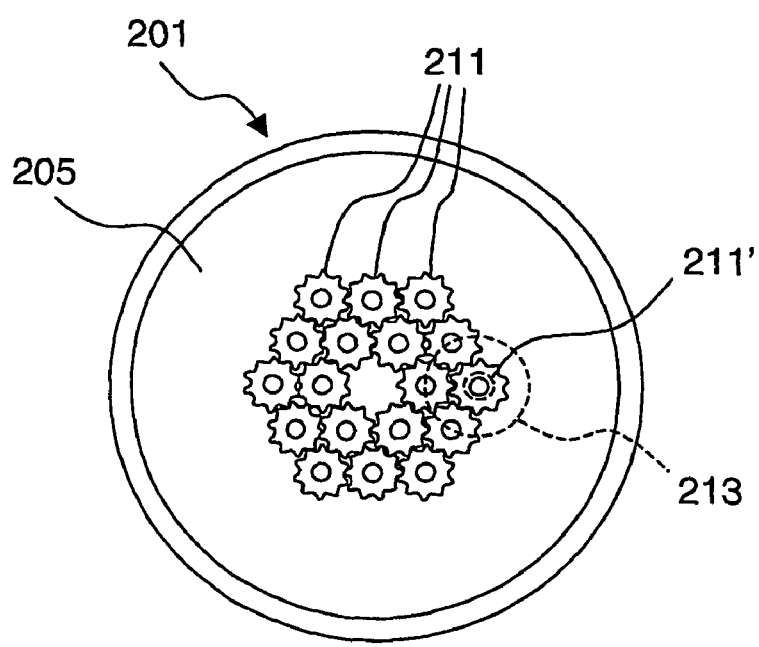
FIG. 4 is a top view of the molding apparatus of FIG. 3.
Figure 5:
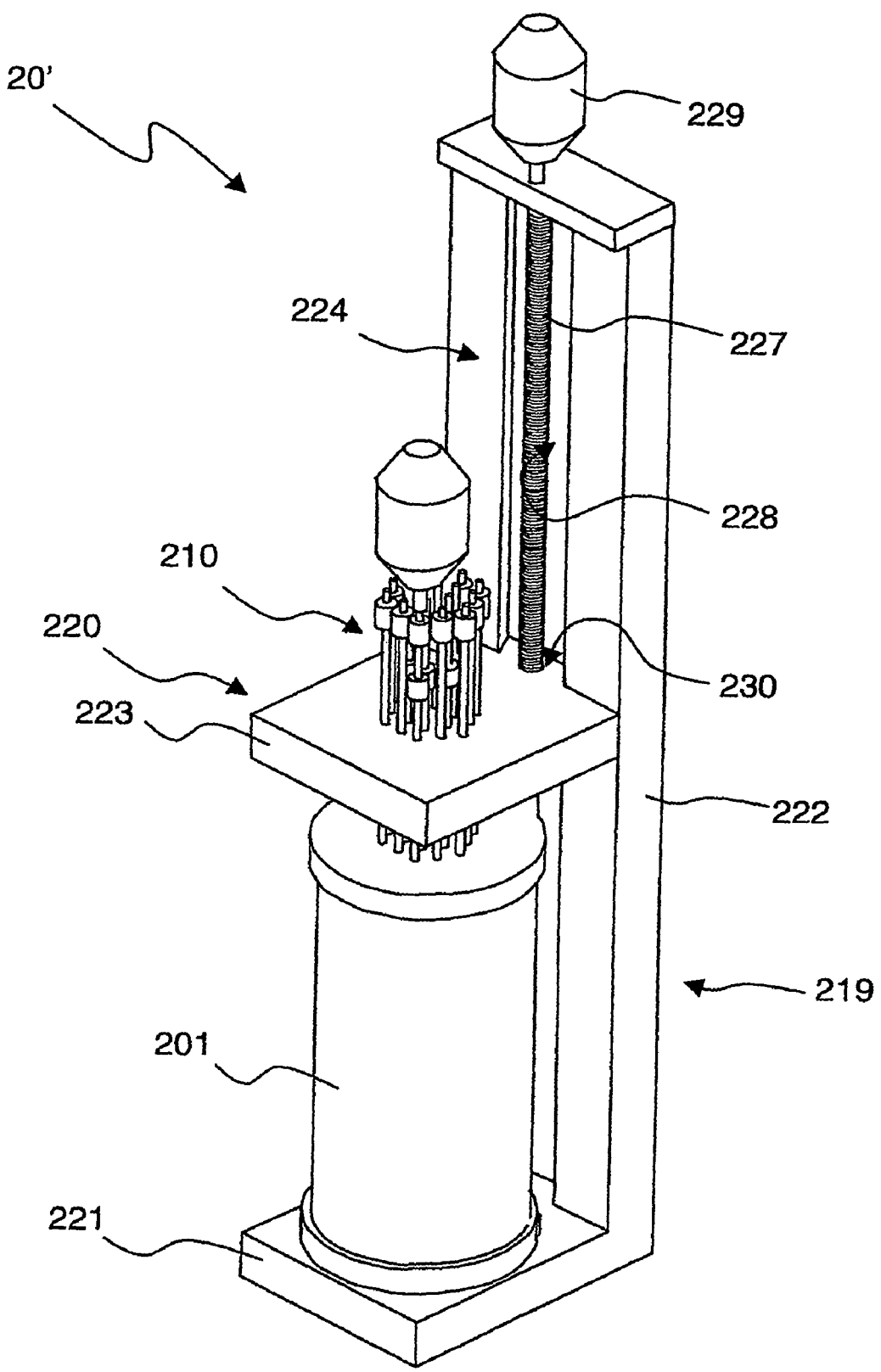
FIG. 5 shows an alternative embodiment of the molding apparatus of the present invention

With reference to FIGS. 3 and 4, the molding apparatus 20 comprises a cylindrical container 201 wherein the sol will be formed into the gel core preform, and a set of spaced elongate elements 202 (some of which are not represented) crossing longitudinally the container 201 and suitable to be mechanically removed from the gel preform at the end of the sol-to-gel transformation process.

Elongate elements 202 may be wires, rods or tubes, and are arranged so as to define a predetermined internal structure of the gel core preform. This internal structure of the preform will correspond to the internal microstructure of the final fibre, and the elongate elements 202 will be therefore referred to also as "microstructure-generating elements".

Container 201 preferably comprises a cylindrical lateral wall 203 having a central axis 204, and a first and a second cover 205 and 206—upper and lower, respectively—that fit with the extremities of the lateral wall 203. The choice of the diameter of container 201 is based on practical considerations of easy handling and processing.

Appropriate coupling means (not shown), such as tie rods and nuts, screw caps or flanged connections, may be used to fix covers 205 and 206 to wall 203. Sealing members may be interposed between the lateral wall 203 and the covers 205, 206, in order to avoid passage of fluids from the internal of the container 201 to the external, or vice versa.

In place of lower cover 206 there may be a base wall integral with lateral wall, so as to form a one-piece cup-shaped container.

The lateral wall 203 may be a tubular member made of glass, plastic, or metal. Covers 205, 206 may be disk-like members made of PTFE. The upper cover 205 preferably has a plurality of passing holes 205a arranged as the microstructure-generating elements 202.

Similarly, the lower cover 206 may have a plurality of recesses 206a arranged as holes 205a. Covers 205, 206 are positioned so that the holes 205a are aligned with recesses 206a. Means may be provided for easily allowing this alignment, like reference signs or coupling by pins. Preferably, upper cover 205 is relatively thick, so as to provide a guiding function for the microstructure-generating elements 202.

If a central hole is to be formed along axis 204 of the fiber, the set of microstructure-generating elements 202 will include a central microstructure-generating element, and covers 205, 206 will be provided with a corresponding hole and a corresponding engage recess, respectively.

When the molding apparatus 20 is assembled, the microstructure-generating elements 202 pass through the plurality of holes 25a on one end and engage recesses 26a on the other end. Microstructure-generating elements 202 advantageously have dimensions and rigidity that allow easy handling and easy molding apparatus assemblage, and may be identical cylindrical members or may be of different sizes and of different materials.

The material of microstructure-generating elements 202 is preferably such as to avoid corrosion in the sol polymerization process and to avoid damages in the extraction operation. The elements 202 are preferably made of metal, plastic, rubber or glass. Elements 202 may also be made of, or coated with, PTFE, which reduces adhesion of the gel. Other useful materials are coated metals, preferably with a ceramic coating, and silanised glasses, which improve smoothness of the elements' surface.

In the case of holes of relatively large cross-section (several mm or more), elements 202 are preferably made of an elastomeric material, such as rubber, and they can be pulled out by applying a mechanical load, at room temperature. In this case, because under tensile stress the diameter of a rubber tube or rod is reduced by a factor related to the Poisson ratio of the material, the risk of damages of the internal surface is limited.

One or more elements of the set of elements 202 may be designed to remain embedded in the preform so as to become a structural element of the preform and, then, a micro-structural element of the fibre. The function of these elements can be optical or mechanical. For example, molding apparatus 20 may include a central microstructure-generating element designed to remain embedded in the gel structure so as to form a central structural element thereof. The elements designed to remain embedded in the preform will be made of predetermined material that is different from the bulk material of the preform and that is suitable to stretch when, at the end of the process for manufacturing the fibre, the final preform is drawn into an optical fibre. For example, the central microstructure-generating elements 202 may be a glass rod containing germanium.

The arrangement and the dimension of microstructure-generating elements 202 shall be chosen so as to obtain a predetermined spatial distribution and size of holes in the fibre to be manufactured. In particular, the ratio between the diameter of elements 202 and their reciprocal distance shall correspond to the predetermined ratio d/Λ between the diameter d of the holes 5 in the final fibre (more in general, of the microstructural elements in the cladding region) and their periodicity Λ. Differently, the ratio between the diameter of elements 202 and the internal diameter of container 21 shall not necessarily correspond to the ratio d/D between the diameter d of the holes and the external diameter D of the final fibre, and can be chosen according to exigencies of easy handling and processing. In particular, too little dimensions and spacing of the holes make molding apparatus assemblage very difficult, whereas a too large container diameter complicates preform post-processing and is likely to cause scrap.

As shown in FIG. 3, molding apparatus 20 may include a rotation mechanism 210, apt to impart a rotation to the microstructure-generating elements 202 about the respective axes. Mechanism 210 preferably comprises a plurality of gear wheels 211, each rigidly coupled to a corresponding microstructure-generating element 202. The gear wheels 211 preferably have the same dimensions, so that a same rotation rate can be imparted to the different microstructure-generating elements 202.

The set of gear wheels 211 is advantageously subdivided in a first and in a second group 211a, 211b, positioned at different heights for encumbrance reasons. This arrangement can be obtained for example by providing microstructure-generating elements 202 of different lengths. In the particular embodiment of FIG. 3, the first group of gear wheels 211a is associated with an outer set of microstructure-generating elements 202 (twelve in FIG. 3), while the second group 211b is associated with an inner set of microstructure-generating elements 202 (six in FIG. 3).

One of the microstructure-generating elements 202 carries two superimposed gear wheels 211', 211", respectively of the first group 211a and of the second group 211b, and is coupled to a motor 213 suitable to impart a rotation thereto.

The transmission gear wheels 211' and 211" are engaged in chain transmission with the other gear wheels of the first group 211a and of the second group 211b, respectively.

As shown in FIG. 6, molding apparatus may be a more complex apparatus, here indicated with 20', which includes, in addition to rotation mechanism 210, a translation mechanism 220 suitable to provide the microstructure-generating elements 202 with an axial (i.e. longitudinal) motion, preferably alternate. The axial motion is imparted to the microstructure-generating elements 202 to avoid adhesion of the gel to the microstructure-generating elements 202 during gelation of the sol.

Apparatus 20' also includes a supporting structure 219, which comprises a horizontal basement 221 for the container 201 and a vertical wall 222 extending from the horizontal basement 221 to support the translation mechanism 220. The vertical wall 222 has a height that is more than two times the height of the container 201.

The translation mechanism 220 comprises a horizontal platform 223 slidely coupled to the vertical wall 222 and a motorized device 226 to impart a translation motion to the horizontal platform 223.

Figure 6A:
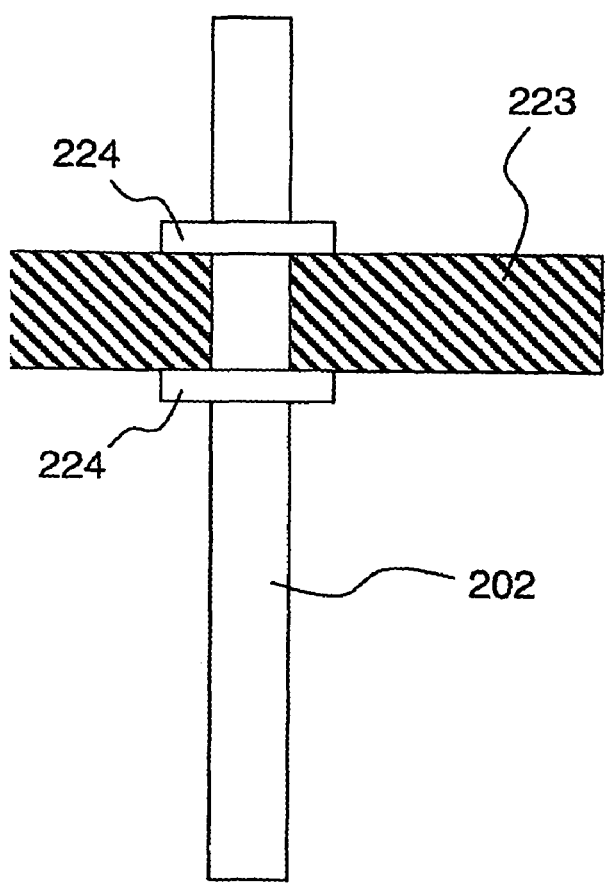
FIGS. 6a and 6b illustrate a particular of the molding apparatus of FIG. 5.
Figure 6B:
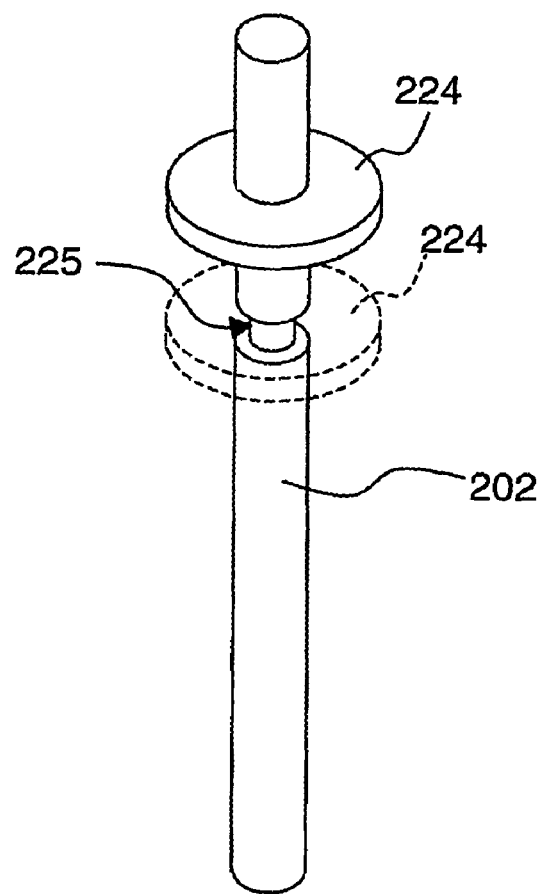

The horizontal platform 223 has a plurality of holes, which are passed through by the microstructure-generating elements 202. As shown in FIGS. 6a and 6b, each microstructure-generating element 202 may be coupled to the horizontal platform 223 by means of two abutments 224 positioned on opposite sides of the horizontal platform 223, so as to be integral with the horizontal platform 223 during the translation motion. Advantageously, the abutments 224 provide a substantially negligible constraint to the rotation of the microstructure-generating elements 202. In other words, the microstructure-generating elements 202 are substantially free to rotate.

The abutments 224 may be defined for example by "Seeger" rings, applied on respective annular seats 225 (only one of which is shown) provided on each microstructure-generating element 202.

A different solution for providing an axial constraint and a rotation freedom of the microstructure-generating element 202 is that of applying two ball-bearing fifth wheels (not shown) to the microstructure-generating element 202 on opposite sides of the horizontal platform 223. The two ball-bearing fifth wheels may be axially fixed to the microstructure-generating element 202 by means of Seeger rings.

The motorized device 226 is suitable to vertically move the platform 223 between a first (lower) position close to the top of the container 221 wherein the microstructure-generating element 202 extend along the container 221 down to the lower cover 206, and a second (upper) position close to the top of wall 222 wherein microstructure-generating element 202 are extracted from the container 221.

The device 226 comprises an elongated threatened screw 227 extending vertically in a recess 228 of the vertical wall 222, and a motor 229 positioned on top of vertical wall 222 to impart a rotation motion to screw 227. Screw 227 is coupled with a nut-screw 230 provided on the platform 223, in particular on an extension 223a of the platform 223 that fits into recess 228, so that rotation of screw 227 produces a vertical motion of platform 223.

It can be appreciated that rotation mechanism 210 and translation mechanism 220 can be operated independently from each other or in combination, so that the microstructure-generating elements 202 can be rotated without translation, translated without rotation, or translated and rotated at the same time.

The process of producing a gel preform by molding apparatus 20 and the subsequent steps of transforming the gel preform until a final optical fiber is obtained are herein below described with reference to FIGS. from 7a to 7m.

The process starts (FIG. 7a) with the preparation of a liquid precursor, in particular a raw material consisting of an inorganic sol, here indicated with 80. The sol 80 may be obtained by mixing a glass precursor and water; in particular, the sol 80 may be obtained by a chemical reaction implying metal alkoxides and water in an alcoholic solvent. The first reaction is typically a hydrolysis, which induces the substitution of OR groups linked to silicon by silanol Si—OH groups. These chemical species may react together to form Si—O—Si (siloxane) bonds, which lead to the silica network formation. This phase establishes a 3D network that invades the whole volume of the container. The liquid used as solvent to perform the different chemical reactions in these two syntheses remains within the pores of the solid network.

In a second step (FIG. 7b), after assemblage of molding apparatus 20, the inorganic sol 80 is poured into container 201. Sol 80 may be poured through holes 25a before inserting the microstructure-generating elements 202, or through an appropriate inlet (not shown) provided on upper cover 205. In the first case, the structure-generating elements 202 are inserted into container 201 after pouring the sol, but before gelation thereof.

The appropriate temperature and pressure conditions, preferably normal environmental temperature and pressure, are then imposed for the time required for sol to harder and completely transform into a gel body (FIG. 7c), here indicated with 81.

During transformation of sol into gel, a motion, preferably continuous, is imparted to the microstructure generating elements 202. The Applicant has in fact found that the motion of the microstructure generating elements 202 during gelation of the sol prevents adhesion of the gel to the elements surface.

In one possible realization of the process of the present invention, rotation mechanism 210 is activated to impart a slow rotation to the microstructure generating elements 202. In particular, the motion is transmitted from motor 213 to gear wheels 211' and 211", then to the other gear wheels and the microstructure generating elements 202 associated therewith.

The Applicant has observed that the shearing motion of the liquid near the surface of the rotating elements results in a hole in the gel that is slightly larger in diameter with respect to the element diameter, thereby reducing the probability of gel surface cracking during the element extraction.

The Applicant has verified that a convenient range for the rotation rate of the microstructure generating elements 202 in order to have the said advantages is between about 1 and 120 rpm.

In a second possible realization of the process of the present invention, the translation mechanism 220 is activated so as to impart an alternate axial motion to the microstructure generating elements 202 at a velocity preferably comprised between 1 and 20 mm/min. The direction of the motion is inverted at a frequency preferably comprised between 0 and 100 inversions/min.

In a third possible realization of the process of the present invention, both the rotation mechanism 210 and the translation mechanism 220 are activated, so as to impart both a rotation and an axial alternate translation to the microstructure generating elements 202. The rotation velocity is preferably comprised between about 1 and 120 rpm and the translation velocity is preferably comprised between 1 and 20 mm/min. The direction of the axial motion is inverted at a frequency preferably comprised between 0 and 100 inversions/min.

As a gel body is formed, the microstructure generating elements 202 are removed from the container 21 by lifting the platform 223 to its upper position. The internal structure of said gel body is thereby defined.

In a possible realization of the process of the present invention, a subset of the microstructure generating elements 202 may remain embedded in the gel body so as to form microstructural portions of the fiber. When a microstructure-generating element 202 is extracted, a hole of substantially the same size and geometry is generated in the gel body. The above mentioned technique of moving the microstructure-generating elements 202 during gelation of the sol guarantees the absence of any cracks due to elements extraction and the uniformity of the holes. The result of this last step is a gel core preform 82 having a predetermined internal structure.

The gel preform 82 is then extracted from the container 201 (FIG. 7e). In particular, covers 205 and 206 are separated from lateral wall 23, and gel preform is extracted from lateral wall 23.

The gel core preform 82 is then transformed into an aerogel core preform 83 (FIG. 7f), by removing the solvent from the pores of the gel material, which could cause cracking. The process of transforming gel into aerogel can comprise aging, solvent exchange and supercritical drying. Preferably, the gel is first subjected to solvent exchange, and then drying by thermal treatment in supercritical conditions for the solvent is performed. A process for transforming a gel into an aerogel is described, for example, in U.S. Pat. No. 5,207,814.

The aerogel core preform 83 may then be sintered in a sintering furnace 30, so as to obtain an intermediate glass core preform 84 (FIG. 7g) having the same ratio between holes diameter and preform external diameter. Sintering furnace 30 can be any furnace known in the art suitable to sintering a gel preform into a glass preform, in particular any furnace suitable to generate a time-variable temperature ranging at least up to 1300° in an atmosphere of helium and/or chlorine gas. Sintering preferably comprises a thermal treatment for the consolidation of the aerogel, in the presence of suitable gases, such as oxygen, chlorine and helium, for removing organic residues and water. Thermal treatment is preferably performed at a temperature that varies so as to perform oxidation of organic residuals in the aerogel, dehydration to remove water and, finally, consolidation of the aerogel.

One or more further structural elements, if required, can be inserted at this stage in the holes previously made in the intermediate core preform, for instance glassy core rods 85 having a different refractive index (FIG. 7h). Such elements, as the ones that may remain in the body under formation from the beginning of the process, become structural elements of the preform and, then, micro-structural elements of the fibre. The function of these elements can be optical or mechanical. In the former case the element has been inserted to vary the optical propagation properties of the final fibre, and it can have a higher or lower refractive index with respect to the bulk. One or more element may be also inserted for varying the optical properties through stress induced optical effects. This step of inserting further structural elements may alternatively be performed before the step of sintering the preform.

The resulting preform 84 may then be stretched by a stretching device 40 of a known type to obtain a core rod 51 (FIG. 7*i*). As schematically illustrated, the stretching device 40 typically comprises a conventional draw furnace 41 and a tractor device 42 to draw the core rod 51 from the glass preform 84.

An overcladding layer may then be applied to the stretched core rod 51, by the so known "rod-in-tube" technique (FIG. 7*l*) or by a vapour deposition process (such as an OVD process) of a known type. According to the "rod-in-tube" technique, a rod-in-tube assembly 50 of a known type is used to apply onto the core rod 51 a previously realized tubular body 52 made of glass and to collapse body 52 onto core rod 51. At the end of this step a structured final preform is obtained.

The steps of stretching and of overcladding may be required to obtain a structured final glass preform with a predetermined d/D ratio. In fact, since the choice of the dimensions of container 201 and microstructure-generating elements 202 in molding apparatus 20 is based on practical consideration of easy handling and processing, the ratio d/D in the core preform may be larger than that needed in the microstructured fiber. However, the dimensional ratio d/Λ is maintained.

Therefore, stretching is convenient for a further reduction of the holes diameter.

The last step of the overall process (FIG. 7*m*) is the drawing of the structured final preform so obtained, indicated with 61, by a drawing tower 60 of a known type, to obtain the microstructured fibre 62, which is wound onto a reel 63.

As a possible alternative, the drawing may be performed directly on the intermediate glass core preform 84 (obtained by sintering the aerogel core preform 83) or on the core rod 51.

It will be apparent to those skilled in the art that various modifications and variations can be made to the disclosed embodiment of the present invention without departing from the scope or spirit of the invention.

In particular, some steps of the above-described process may be omitted or may be executed in a different order.

For example, the glass core preform obtained at the end of the sintering step could be directly drawn, thus omitting the steps of stretching and rod-in-tube assembling. Alternatively, this glass core preform could be directly subjected to the rod-in-tube process without being previously stretched.

The following examples relate to the production of different aerogel preforms according to the process of the present invention.

Example 1

A micro-structured fibre is manufactured as follows. First, 50 gr of tetraethylortosilicate (TEOS) is stirred for about 30 minutes at room temperature with 150 ml of a 0.01 N solution of hydrochloric acid. The pH of the colloidal solution is raised to 4.0 with ammonia solution obtaining a suitable sol for the successive gelation step.

The sol is then poured into the container 201 already assembled with three microstructure generating elements 202 arranged in a triangular configuration. The container 201 is made of PTFE material. The microstructure generating elements 202 are made of stainless steel rod of 3 mm diameter and 250 mm length.

After pouring of the sol, the container is closed and the microstructure generating elements 202 are set into rotation at a rate of 80 rpm.

Gelation of the sol occurs in many hours. After about 68 hours a small shrinkage is observed, rotation of the microstructure generating elements 202 is stopped and the microstructure generating elements 202 are extracted by pulling out them from the container 201.

The gel is then soaked first in water and later in acetone, which is the liquid used in the further drying step. Drying is carried out in supercritical conditions, by putting the gel in an autoclave of 5 liters of volume, which is then pressurized with nitrogen up to 50 Bar. Heating is then started with a rate of 100° C./hour. Pressure is increased up to 65 Bar and then maintained constant, by acting on a vent valve, until the temperature has reached 290° C. At this point the valve is opened and the pressure is decreased with a rate of 7.5 Bar/hour. The autoclave is then cooled down to room temperature. The sample obtained is a structured aerogel preform free from defects or cracks.

The structured aerogel preform obtained is gradually heated in air up to 280° at the heating rate of 5° C./min; from 280 to 400° C. at 1° C./min; from 400 to 1250° C. at 2° C./min. The temperature is then maintained for 6 hours and finally decreased to 25° C. The structured glass preform has a size of about 50% with respect to the starting structured aerogel preform.

Example 2

In a different experiment, 100 gr of tetraethylortosilicate (TEOS) are stirred for about 30 minutes at room temperature with 300 ml of a 0.01 N solution of hydrochloric acid. The clear solution is then concentrated by using roto-vapor until the elimination of 140 ml of ethanol/water moisture. Then, 58 gr of fumed silica are added to the clear solution. The resulting mixture is vigorously stirred until homogenization and then centrifuged at 1500 rpm for 10 minutes. The pH of the colloidal solution is raised to 3.9 with ammonia solution obtaining a suitable sol for the successive gelation step.

The sol is then poured into the container 201. The container 201 is made of PTFE material. The microstructure-generating elements 202 are stainless steel rods of 3 mm diameter and 250 mm length; the spacing between two elements is 7.5 mm (d/Λ=0.4). The pattern of microstructure-generating elements 202 has a hexagonal shape like in FIG. 1.

After pouring the sol, the container 201 is closed and the microstructure-generating elements 202 are set into rotation at a rate of 100 rpm.

Gelation of the sol occurs in some hours. After 15-20 hours a small shrinkage is observed and the microstructure-generating elements 202 can be manually extracted by pulling them out from the container 201.

The gel is then soaked in acetone and later in ethylacetate, which is the liquid used in the further drying step. Drying is carried out in supercritical conditions, by putting the gel into an autoclave of 5 liters of volume, which is then pressurized with nitrogen up to 50 Bar. Heating is then started with a rate of 100° C./hour. Pressure is increased up to 60 Bar and then maintained constant, by acting on a vent valve, until temperature has reached 290° C. At this point the valve is opened and the pressure is decreased with a rate of 7.5 Bar/hour. The autoclave is then cooled down to room temperature. The sample obtained is a structured aerogel preform free from defects or cracks.

The structured aerogel preform is gradually heated in flux of helium and oxygen up to 500° C. at the heating rate of 1° C./min; from 500 to 900° C. in flux of helium, oxygen and chlorine at heating rate of 1° C./min; from 900 to 1200° C. in flux of helium, oxygen and chlorine at 0.8° C./min; from 1200 to 1350° C. in flux of helium at 0.8° C./min. The temperature is then maintained for 6 hours and finally decreased to 25° C.

A structured glass preform free from hydroxyl groups (less then 1 ppm) is then obtained, reduced in size of about 50% with respect to the starting structured aerogel preform.

The invention claimed is:

1. A method for forming an intermediate preform in a process of manufacturing a micro-structured optical fiber, comprising:
   forming a sol containing a glass precursor;
   pouring the sol in a container having inside a set of elongate elements;
   aging the sol so as to obtain a gel body;
   removing at least one of the elongate elements from the gel body to create a corresponding hole in the gel body;
   removing the gel body from the container; and
   prior to commencement of removing said at least one of the elongate elements from the gel body, imparting a motion to said at least one elongate element while simultaneously retaining said at least one elongate element inside the container during at least part of the step of transforming the sol into a gel.

2. The method of claim 1, wherein imparting a said motion to said at least one elongate element while simultaneously retaining said at least one elongate element inside the container comprises imparting a rotation to said at least one elongate element about its longitudinal axis.

3. The method of claim 2, wherein said rotation is imparted at a rate between about 1 and 120 rpm.

4. The method of claim 1, wherein imparting said motion to said at least one elongate element while simultaneously retaining said at least one elongate element inside the container comprises imparting an axial movement to said at least one elongate element.

5. The method of claim 4, wherein the axial movement is an alternate movement.

6. The method of claim 4, wherein the axial movement is imparted with a velocity of about 1 to 20 mm/min.

7. The method according to claim 1, wherein all the elongate elements of said set of elongate elements are removed from the gel body.

8. The method according to claim 1, wherein imparting said motion to said at least one elongate element while simultaneously retaining said at least one elongate element inside the container comprises imparting a motion to all the elongate elements of said set of elongate elements during at least part of the step of transforming the sol into a gel.

9. The method according to claim 1, wherein at least one of said elongate elements is kept in the gel body.

10. The method according to claim 1, wherein forming a sol comprises mixing at least one glass precursor and water.

11. The method according to claim 1, wherein the elongate elements are rod-like or tubular members.

12. The method according to claim 1, wherein imparting said motion to said at least one elongate element while simultaneously retaining said at least one elongate element inside the container during at least part of the step of transforming the sol into the gel inhibits adhesion of the gel to the at least one elongate element prior to commencement of removing said at least one elongate element.

13. The method according to claim 1, wherein imparting said motion to said at least one elongate element while simultaneously retaining said at least one elongate element inside the container during at least part of the step of transforming the sol into the gel generates a hole in the gel larger than said elongate element prior to commencement of removing said at least one elongate element.

14. The method according to claim 1, further comprising:
   between imparting said motion to said at least one elongate element and removing said at least one elongate element from said gel body, stopping said motion of said at least one elongate element.

15. The method according to claim 1, wherein:
   commencement of removing said at least one of the elongate elements from the gel body occurs after shrinkage of the gel body occurs; and
   imparting said motion to said at least one elongate element while simultaneously retaining said at least one elongate element inside the container includes imparting said motion at least in part before said shrinkage of the gel body occurs.

16. The method according to claim 1, wherein:
   removing said at least one of the elongated elements from the gel body includes moving said at least one elongated element in a first direction; and
   imparting said motion to said at least one elongate element while simultaneously retaining said at least one elongate element inside the container includes imparting motion in a second direction.

17. The method according to claim 16, wherein imparting motion in said second direction includes rotating said at least one elongated element.

18. The method according to claim 16, wherein imparting motion in said second direction includes translating said at least one elongated element.

* * * * *